United States Patent [19]

Hutter

[11] 4,415,705

[45] Nov. 15, 1983

[54] ROSIN DERIVATIVES USED AS DISPERSANTS

[75] Inventor: G. Frederick Hutter, Upper Montclair, N.J.

[73] Assignee: Inmont Corporation, Clifton, N.J.

[21] Appl. No.: 399,643

[22] Filed: Jul. 19, 1982

[51] Int. Cl.[3] .......................... B01F 17/52; C08K 5/01; C08K 5/02; C09D 11/02
[52] U.S. Cl. ................................... 525/167.5; 106/20; 106/27; 106/30; 106/308 N; 106/308 F
[58] Field of Search ................. 106/20, 30, 27, 308 N, 106/308 F; 525/167.5

[56] References Cited

U.S. PATENT DOCUMENTS

| | | | |
|---|---|---|---|
| 3,778,394 | 12/1973 | Lovald et al. | 106/30 |
| 3,881,942 | 5/1975 | Buckwalter | 106/30 |
| 4,224,212 | 9/1980 | Topham | 106/20 |

Primary Examiner—Ronald W. Griffin
Attorney, Agent, or Firm—Michael R. Chipaloski

[57] ABSTRACT

High-solids pigment concentrates are disclosed containing a novel dispersing agent formed by reacting a poly (lower alkylene) imine, having molecular weight of 1,000 to 15,000 with a polyester comprising the esterification product of hydroxystearic acid, or its oligomer, with tall oil rosin.

8 Claims, No Drawings

ROSIN DERIVATIVES USED AS DISPERSANTS

This invention relates to compounds which are useful as dispersing agents in preparing high-solids pigment concentrates for use in the manufacture of lithographic inks, and to concentrates and inks containing such compounds.

Due to the economics of the ink business today, it is highly desirable to be able to process pigments into high-solids concentrates. Typically, such concentrates would contain from 40 to 60% pigment. Ideally, they could be let down in a wide variety of vehicles in order to produce a wide range of finished inks.

The economic advantages offered by such concentrates are two-fold. First, they would greatly reduce the inventory of intermediates which must be carried by an ink plant. Only one intermediate dispersion would be needed for each pigment, versus the several which are now typically used. Second, energy consumption would be considerably reduced. The higher the pigment concentration at which dispersion can be effected, the less the total volume of material that must be processed through a mill, and therefore the less total energy consumed in processing the pigment.

Traditionally, vehicles for lithographic inks are composed of alkyd resins and/or rosin derivatives, together with high-boiling hydrocarbon solvents. It is known in the art that satisfactory dispersions containing 40 to 60% pigment cannot be prepared using such traditional vehicle components alone. Usually mixtures at such solids levels cannot be processed in standard milling equipment. In the few cases where they can be processed, they yield dispersions with unacceptable rheological properties, i.e. dispersions which cannot be pumped or otherwise conveniently transferred from one vessel to another. Such dispersions usually also show inferior color development, and poor aging stability.

Recently attempts have been made to overcome the above-described problems by using compounds which are better dispersants for pigments than are the traditional alkyd resins and rosin derivatives. For example U.S. Pat. No. 4,224,212 describes the use of dispersing agents attained by reacting a poly (lower alkylene) imine with a polyester having free carboxylic acid groups to form reaction products containing at least two polyester chains attached to each poly (lower alkylene) imine chain. Preferred polyesters are the polyesters of an hydroxy carboxylic acid of the formula HO—R—COOH where R is a divalent aliphatic radical containing at least 8 carbon atoms and in which there are at least 4 carbon atoms between the hydroxy and carboxylic acid groups. Preferred polyesters are also the polyesters formed from a mixture of aforementioned hydroxy carboxylic acids with a carboxylic acid which is free from hydroxy groups. Specific examples of hydroxy carboxylic acids mentioned in U.S. Pat. No. 4,224,212 are ricinoleic acid, a mixture of 9- and 10-hydroxystearic acid (obtained by sulphation of oleic acid followed by hydrolysis), and 12-hydroxystearic acid, and especially the commercially available hydrogenated castor oil fatty acid which contains minor amounts of stearic acid and palmitic acid. Specifically mentioned carboxylic acids free from hydroxy groups are alkyl and alkenyl carboxylic acids containing a chain of 8 to 20 carbon atoms, e.g. lauric acid, palmitic acid, stearic acid and oleic acid.

An especially preferred polyester disclosed in U.S. Pat. No. 4,224,212 is one prepared from commercial 12-hydroxy stearic acid having a number average molecular weight of about 1600, which corresponds to an oligomer containing an average of 4 to 5 molecules of polymerized 12-hydroxystearic acid and one molecule of esterified stearic acid. The stearic acid comes from the commercial grade of hydroxystearic acid which always contains some stearic acid. The preferred polyester is reacted with the polyethylene imine in the weight ratio of 1 to 10 parts polyester for each part of polyethylene imine.

The polyethylene imines preferred in the above cited prior art patent are either the substantially linear form or a branched form, especially a highly branched form in which at least 20% of the nitrogen atoms are present in tertiary amino groups, for example PEI600 (mol. wt. 50,000) and Polymin P (mol. wt. 50,000) and their methylated derivatives. The methylation is used apparently to convert some of the secondary amino nitrogen atoms to tertiary amino groups.

U.S. Pat. No. 4,224,212 further describes the preparation of pigment dispersion in liquid hydrocarbon using the above-described dispersing agents. The patent discloses that 5 to 50% by weight of dispersing agent, based on pigment can be used in the preparation of the dispersions; however, the patentees prefer 15 to 40% by weight of dispersant and illustrate by example only 15 to 30% by weight of dispersant based on pigment. The dispersions contain 20 to 50% by weight of pigment. The relatively high level of dispersing agent required renders these dispersions unsuitable for use in bases for lithographic ink production. Since their composition varies considerably from that of conventional vehicle components such as alkyds and rosin derivatives, the presence of such large quantities of these agents in a lithographic ink has a detrimental effect on such physico-chemical properties as tack and drying rate. Furthermore, the high amine content of these agents makes them hydrophilic, and the presence of large quantities of hydrophilic compounds in a lithographic ink causes problems of emulsification during printing.

It has now been discovered that very desirable dispersing agents can be made by reacting low molecular weight polyethylene imine with low molecular weight polyesters formed by esterifying commercial 12-hydroxystearic and tall oil rosin in the ratio of one mole of tall oil rosin and from one to six moles of 12-hydroxystearic acid. The esterification is carried out by heating at 200° to 205° C. for 12 hours in the presence of 0.1% dibutyltin oxide catalyst. The structure of the polyester can be represented by the formula

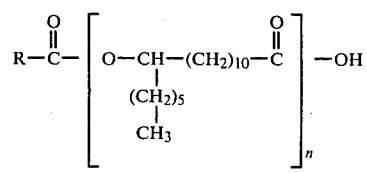

where

is the rosin acid radical and the stearyl radical, and where n=1 to 6.

The dispersing agent is formed by reacting the above polyester with a low molecular weight polyethylene imine, e.g. molecular weight about 1,000 to 15,000, by heating for 6 hours at 150°–155° C. to give a viscous liquid. The ratio of polyester to polyethylene imine is preferably on the order of 75 to 99% by weight of the polyester and 25 to 1% of the polyethylene imine. Such dispersing agents are very desirable for making high concentration pigment dispersions, or bases, for preparing printing inks, especially lithographic printing inks.

Although the rosin modified polyester/polyethylene imine dispersant as described has some similarity to the dispersants described in U.S. Pat. No. 4,224,212, it is to be noted that the rosin acid molecule is not linear and therefore does not give the "polyester chain" that is described in the patent. In view of the complex nature of the resinous acids contained in rosin it is not possible to anticipate exactly how it would behave in the reaction with hydroxystearic acid. In fact it has been noted that not all rosins react with hydroxystearic acid to give the same products when further reacted with polyethylene imine. Dispersants made by reacting tall oil rosin esters of hydroxystearic acid oligomers with polyethylene imine have been found to be unexpectedly superior to products made from the wood rosin and gum rosin.

Furthermore, the above-described rosin derivatives are effective dispersants at a level of only 1–10% based on the weight of pigment, when used in conjunction with conventional rosin derivatives and/or alkyd resins. At such low levels, the dispersants are almost entirely adsorbed on the pigment surface and are therefore not free to cause emulsification problems during printing. Dispersants prepared according to the teaching of U.S. Pat. No. 4,224,212, when used at these low levels, give concentrates with unacceptable rheological properties.

The following examples in which the parts are by weight are given to illustrate further the invention.

EXAMPLE 1

Preparation of a Rosin-Based Dispersant

An ester is prepared by reacting 2340 parts of commercial 12-hydroxystearic acid with 756 parts of tall oil rosin (Unitol NCY Grade, available from Union Camp Corp.) at 200°–205° C. for 12 hours using 3.1 parts of dibutyltin oxide catalyst. 935 parts of the resulting ester are then reacted with 65 parts of polyethylene imine having a molecular weight of 1200 at 150°–155° C. for six hours to form a rosin-modified dispersing agent in accordance with the invention.

EXAMPLE 2

Black Pigment Concentrate

A carbon black dispersion was prepared from

| | |
|---|---|
| Varnish (30% Alkyd resin, 30 Pentalyn G and 40% Magie 470 oil) | 16 parts |
| Alkyd resin (as above) | 9 parts |
| Antioxidant (15% Phenol, 85% Magie 535) | 1 parts |
| Magiesol 52 | 10.5 parts |
| Magie 535 oil | 10.5 parts |
| Carbon black pellets (Regal 300I) | 50 parts |
| Rosin modified Dispersant | 3 parts |

| |
|---|
| as in Ex. 1 | by premixing the ingredients with a high speed disc disperser and then milling the ingredients in a Netzsch horizontal pin mill using 85% volume loading of 0.45 millimeter carbon steel shot as the grinding media and a feed rate of 10 pounds per hour.

The concentrate has a Brookfield viscosity of 282 poise initially and 368 poise after three days aging. It flows readily by gravity and can be handled by pumps commonly used in the art.

The alkyd resin used in the above example is a 68.5% linseed oil modified trimethylol ethane-isophthalic acid alkyd having an acid number of 10–12 and viscosity of z5–z6.

Magie 470 oil used in the above example is a petroleum hydrocarbon solvent having a distillation range of 462° to 516° F. (239°–269° C.).

Magie 535 oil used in the above example is a petroleum hydrocarbon solvent having a distillation range of 510° to 600° F. (265° to 315° C.).

MagieSol 52 is a hydrocarbon solvent consisting essentially of saturated non-aromatic hydrocarbon having a distillation range of 508°–580° F. (264° to 305° C.).

Pentalyn G as used in the above example is described by the supplier as a hard thermoplastic resin which is a maleic-modified pentaerythritol ester of rosin. It has a softening point of 130°–140° C. (Hercules drop method).

EXAMPLE 3

Comparative Concentrate with No Dispersant

A concentrate made according to the formula in Example 2 but containing no dispersant could be premixed and milled only with extreme difficulty. Premixing was tedious because the pigment could only be added slowly by increments. Milling was slow and erratic; it could only be accomplished at an average feed rate of 5.4 lb./hour. The finished dispersion had a viscosity of 1170 poise and was extremely difficult to handle.

EXAMPLE 4

Comparative Concentrate with Non-Rosin Dispersant

A concentrate was made according to the formula in Example 2, substituting a dispersant made according to the teaching of U.S. Pat. No. 4,224,212, i.e., a dispersant as described in Example 1, but with stearic acid in place of the tall oil rosin. While premixing was easier than with no dispersant (Ex. 3), it was considerably more difficult than in Example 2. The pigment had to be added much more slowly to keep the premix flowing. Milling of this premix was also considerably more erratic than in the case of Example 2. The final dispersion had a viscosity of 226 poise, but it would not flow by gravity, and it thickened to 548 poise on standing for three days.

EXAMPLE 5

Preparation of Quickset Ink

An ink was prepared from

| | |
|---|---|
| Black concentrate (as in Ex. 2) | 40.0 parts |

| | |
|---|---|
| Antioxidant (15% phenol, 85% Magie 535) | 1.0 parts |
| Drier (Mooney Ten-Cem Blend KK-804, containing 2.5–2.6% Zn, 0.75–0.85% Ca and 8.0–8.2% CO) | 2.5 parts |
| Wax compound (84.6% wax, .5% antioxidant as above, 14.9% Magie 535) | 6.0 parts |
| Varnish (19% Pentalyn 833, 19% Filtrez 693 and 67% linseed oil) | 27.0 parts |
| Varnish (42.5% Resin M93, modified phenolic, 27.5% linseed oil, 30% Magie 535) | 23.5 parts |

The above ingredients were mixed in a simple paddle mixer. The resulting ink had excellent printing properties. It showed sufficient penetration on porous stock to facilitate drying of the ink and in this respect was superior to an ink with similar composition except that it contained the stearic/hydroxystearic acid/polyethylene imine dispersant instead of the rosin modified dispersant of the present invention. Similarly, prints made with ink had better gloss and density than the corresponding ink made with the stearic acid modified dispersant.

Pentalyn 833 as used in the above example is a phenolic-modified, rosin-derived resin having a softening point of 182°–188° C. (Hercules drop method).

Filtrez 693 as used in the above Example is described by the supplier as a rosin modified phenolic resin having a ring and ball melting point of 175° C. and an acid number of 11–12.

EXAMPLE 6

Preparation of a News Ink

A news ink was prepared from

| | |
|---|---|
| Black concentrate (as in Ex. 2) | 38.0 parts |
| Nuso 250 | 45.0 parts |
| Varnish (50% Nevchem 140, 50% Nuso 250) | 14.0 parts |
| Magie 535 oil | 3.0 parts |

The above ingredients were mixed in a simple paddle mixer. This ink showed faster solvent penetration into the stock when printed, and therefore faster drying, than did an identical ink employing a concentrate employing the stearic/hydroxystearic acid dispersant.

Nevchem 140 is an alkylated aromatic hydrocarbon resin having a ring and ball softening point of 142° C. (288° F.).

Nuso 250 is a hydrocarbon oil of approximately 400 average molecular weight.

EXAMPLE 7

Heat-set Web Offset Ink

Further to illustrate the formulation flexibility of the concentrates discussed above, a heat-set ink was prepared from

| | |
|---|---|
| Black concentrate (as in Ex. 2) | 31.5 parts |
| Varnish [33% Filtrez 623 resin, 67% alkyd, (90.8% linseed oil, 5.1% fumaric acid, 4.1% glycerin)] | 5.0 parts |
| Varnish (59.0% Nevroz 1520, 1.5% glyceryl mono-oleate, 0.6% aluminum isopropylate, 0.3% tridecyl alcohol, 38.6% Magie 47 oil) | 48.5 parts |
| Linseed oil | 3.0 parts |
| Wax compound 30.0% polyethylene wax, 10.0% Magiesol 52, 60.0% varnish [43.9% Magie 470 oil, 43.0% K1387 resin, 4.7% Pentalyn G, 1.8% tridecyl alcohol, 6.6% gellant compound (39.5% tridecyl alcohol, 21.5% phthalic anhydride, 26.0% Magie 470 oil, 13.0% aluminum isopropylate)] | 6.0 parts |
| Magie 470 oil | 5.0 parts |
| Antioxidant (85% Magie 535 oil, 15% phenol) | 1.0 part |

The ingredients were mixed with a simple paddle mixer. The resulting ink had excellent printing properties.

K1387 is an ink resin supplied by Lawter Chemical Co.

Nevroz 1520 is a hydrocarbon resin supplied by Neville Chemical Co.

What is claimed is:

1. A dispersing agent formed by reacting a poly (lower alkylene) imine, having mol. wt. of 1,000 to 15,000 with a polyester containing free carboxylic acid groups, said polyester comprising the esterification product of hydroxy stearic acid, or its oligomer, with tall oil rosin.

2. A dispersing agent according to claim 1 wherein the esterification is carried out by heating at 150° to 155° C. for 6 hours.

3. A dispersing agent according to claim 1 wherein the polyester is the reaction product of 1 mole of tall oil rosin with 2 moles of commercial 12-hydroxystearic acid containing approximately 12% of stearic acid.

4. A dispersing agent according to claim 3 wherein the poly (lower alkylene) imine is polyethylene imine having a molecular weight of 1200.

5. A pigment dispersion suitable for use in preparing inks, said dispersion comprising 40 to 60% by weight pigment, 6 to 18% by weight of alkyd resin, 0 to 6% by weight of non-alkyd resin, 2 to 10% by weight of rosin modified polyester-polyimine dispersing agent wherein said dispersing agent is formed by reacting a poly (lower alkylene) imine, having mol. wt. of 1,000 to 15,000 with a polyester containing free carboxylic acid groups, said polyester comprising the esterification product of hydroxy stearic acid, or its oligomer, with tall oil rosin and enough solvent to total 100%.

6. A dispersion as in claim 5 wherein the pigment is carbon black.

7. A printing ink comprising pigment dispersed in an ink vehicle comprised of a liquid petroleum hydrocarbon solution of an ink resin and 1 to 10%, by weight, based pigment, of the dispersing agent of claim 1.

8. A printing ink as in claim 7 wherein the pigment is carbon black.

* * * * *